April 18, 1933.  J. G. MAUGER  1,904,495
PROCESS FOR THE DIRECT MANUFACTURE OF KETONES FROM IMPURE VOLATILE ACIDS
Filed May 10, 1930
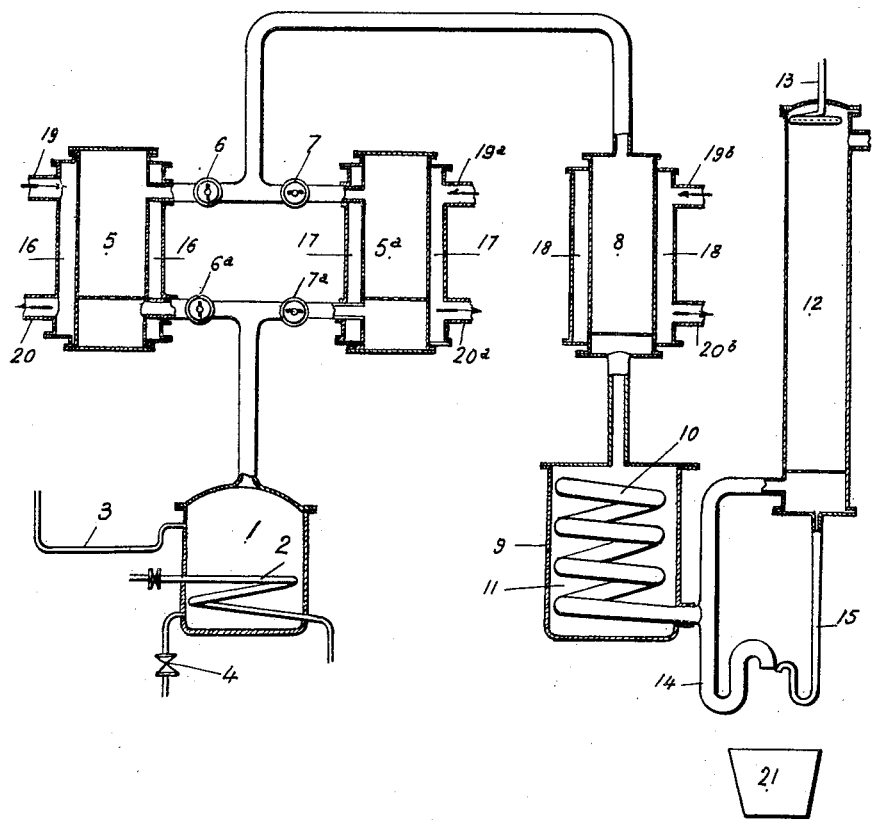
INVENTOR
Jacques G. Mauger
BY
Townsend & Decker
ATTORNEYS.

Patented Apr. 18, 1933

1,904,495

UNITED STATES PATENT OFFICE

JACQUES GEORGES MAUGER, OF PARIS, FRANCE, ASSIGNOR TO SOCIÉTÉ DITE: MAISON CAMUS-DUCHEMIN SOCIÉTÉ ANONYME, OF PARIS, FRANCE, A CORPORATION OF FRANCE

PROCESS FOR THE DIRECT MANUFACTURE OF KETONES FROM IMPURE VOLATILE ACIDS

Application filed May 10, 1930, Serial No. 451,238, and in France May 13, 1929.

The present invention has for its object a process permitting of the industrial transformation by catalysis of dilute volatile acids into ketones in spite of the presence of impurities which are likewise volatile and injurious to the transformation catalyst.

It has been known for a long time that if the vapours of a concentrated volatile acid are passed over an appropriate catalyst at a suitable temperature, this acid is completely transformed into the corresponding ketone with elimination of water and carbonic acid. Thus, for example, with acetic acid ordinary acetone is obtained very easily.

There can be employed as catalyst various substances, for example, bases such as baryta, magnesia, alumina, oxides of rare earths and the like. Various other products have likewise been recommended. The optimum temperature varies with the catalyst employed.

It is likewise known that water does not interfere with the reaction in any manner and that dilute acids are likewise capable of giving industrial yields. From this fact one has been led to attempt to apply this method of treatment to impure dilute acids as are obtained in various industries, for example, to the crude pyroligneous acid produced in the carbonization of wood and which consists of an aqueous solution of acetic acid of a content varying between 5 and 15% of acetic acid contaminated by tarry products in solution or suspension. Unfortunately poisoning of the catalyst by the tarry impurities was encountered, the yield of acetone, at first in the neighbourhood of the theoretical quantity, falling very rapidly to below 50%.

In a case of this nature it is obviously possible to separate the ketone formed from the unconverted acid, and to subject this latter again to treatment by means of a new quantity of fresh or regenerated catalyst, but the expenditure of fuel and the expense of regeneration of the catalyst become excessive and render the process prohibitive.

The fall in yield is due to poisoning of the catalyst by the impurities, that is to say, in the case of pyroligneous acid by the tarry products, and the products produced by the cracking thereof. It is true that certain catalysts can be easily regenerated, but the operation of regeneration would have to be effected too frequently and in addition, would cause losses. The interruptions for this regeneration and the losses which result therefrom therefore render the process of little interest. This is the reason for the fact that whereas the catalytic process has been developed for synthetic acetic acid, and dilute acids of sufficient purity such as, for example, the liquors resulting from the manufacture of cellulose acetate, it has not been possible to employ it economically in carbonization factories.

The inventor of the present process has found that if the impurities injurious to the catalyst can be destroyed or eliminated in whole or in part, the activity of the catalyst remains the same, and the yields are maintained constant.

If the crude vapours of the acid to be converted are passed, before traversing the catalyst for ketone conversion, into a heated chamber containing a product, a mixture or a sequence of products, selected in such a manner that they destroy or transform the impurities in whole or in part, or absorb them or absorb their conversion or transformation products, it is found that the yield is not decreased. It is possible to utilize for this purpose certain appropriate absorbent substances so long as they have no effect on the acid itself, except such causing transformation into ketones. The inventor has found that those which gave the best result were absorbent carbons of vegetable origin and in particular wood charcoal, since they unite in a single product the different effects which must be fulfilled by the absorbent substance which acts at the same time as a simple absorbent and as a catalyst.

But it is possible with the same advantage to replace part of the wood charcoal, for example, by one or more other porous substances, capable of absorbing physically the injurious tarry products, the catalytic effect on the other impurities being obtained by passage of the vapours over the wood charcoal.

The absorbent products utilized can be employed in admixture or successively. They must, in any case, be brought to a temperature characteristic for each of them, which temperature must be the less elevated the more energetic is the destructive action of the porous substance on the acid, but being always sufficient to avoid absorption by the porous substance of the acid to be converted. The best temperature for wood charcoal has been found to be 425° C.

The present invention thus consists, with a view to a transformation of impure volatile acids, diluted or not into ketones by catalysis, in bringing into the state of vapour the impure product to be converted and in transforming or eliminating the impurities contained in these vapours, in whole or in part before or after transformation before effecting the catalytic operation.

It has, in addition, for its object the elimination or transformation of these impurities by means of porous absorbent substances, such as, for example, absorbent carbons. The invention consists finally, more particularly in the application of the process defined above to the ketone conversion of acetic acid contained in pyroligneous acid.

If it is desired, for example, to transform pyroligneous acid into acetone, the process is effected as follows:—

The crude pyroligneous acid is brought into the state of vapour as far as possible in a continuous and regular manner in an appropriate vaporizing apparatus. Obviously the said pyroligneous acid and its vapours should be initially purified as far as possible by known processes for tar removal, although this is not indispensable. The vapours are caused to pass over broken up or granulated wood charcoal contained in a chamber brought by suitable heating means to a temperature of about 425° C. The vapours thus purified subsequently pass into a second chamber containing the catalyst employed for the ketone transformation, for example, thoria. This second chamber is likewise heated and brought to a temperature of 450° C. There is obtained under these conditions a yield in the transformation of about 95% which is maintained for an appreciable time whereas, without wood charcoal, the yield falls very rapidly.

Obviously, the carbon playing the part of protector must be renewed as it loses its purifying properties little by little. This can be done in a continuous manner or periodically. It can, in addition, be very simply regenerated, since it suffices to bring it to a temperature of 500 to 550° C. in the air or in a current of gas or vapour in order to restore its original absorbent qualities, and it can thus be utilized indefinitely. It can likewise be employed as fuel, which obviates the operation of regeneration.

The accompanying drawing illustrates by way of example a schematic representation of an installation in accordance with the invention, suitable for the transformation of pyroligneous acid into acetone based on the above process with periodic renewal of the carbon.

In the drawing:—

1 is the vaporizing apparatus heated by a steam coil 2 but which could, with the same advantage, be constituted by a tubular system or heated by open fire or in any other manner. The pyroligneous acid is introduced into this apparatus in a continuous manner by the tube 3 and the tar residue from the distillation is extracted by the tube 4. Obviously this tar is treated by known means for recovery of the entrained acid, so that this latter can also be subjected to catalysis.

5 and 5a are the chambers containing the wood charcoal which may be utilized in turn by manipulation of the valves 6, 6a and 7, 7a, in order that the carbon in the chamber not in use can be treated for regeneration in the chamber itself by simply changing the temperature of heating. 8 is the chamber containing the catalyst for the acetone transformation, 9 is the condenser intended to condense the dilute acetone obtained, represented in the drawing by a coil 10 immersed in a tank 11 of cold water, 12 represents the scrubber in which are washed the uncondensable gases which may still entrain liquid products, 13 is the supply of washing water to the scrubber, 14 and 15 are the outlets for dilute acetone from the apparatus.

The chambers containing the carbon and the catalyst are here represented by receptacles with a double envelope, 16, 17, 18, heated by hot gases traversing this envelope from top to bottom entering at 19, 19a and 19b and passing out at 20, 20a and 20b. They could, with the same advantage be composed of tubular systems of superposed plates, be horizontal instead of vertical, heated electrically, by open fire, by oil bath, by superheated steam, or by any other method.

The pyroligneous acid, vaporized in 1, passes over the absorbent charcoal placed in 5, for example, the valves 6, 6a being open and the valves 7, 7a being closed. The vapours of pyroligneous acid purified by fixation of the impurities on the carbon pass into chamber 8 wherein there is effected the conversion of the acetic acid into ketone under the influence of the catalyst contained in the chamber 8. The products condensed in 9 and the wash waters obtained in 12 collect in the receptacle 21.

When the carbon contained in 5 has lost its purifying power, the valves 6, 6a are closed and the valves 7, 7a are opened, and then the carbon in 5 is replaced or regenerated and so on.

Instead of having two interchangeable apparatus 5 and 5a for the purification, there need only be one, the absorbent product circulating in any suitable manner, mechanically or by gravity, in a continuous or periodic manner in counter current to the vapours to be purified.

An analogous apparatus would be applicable to the treatment of any volatile acid convertible into ketones and containing injurious impurities.

The vapours of the impure volatile acid may be superheated before entering the chambers 5 or 5ᵃ and in that case the external heating of these chambers may be dispensed with, the superheated vapors being caused to penetrate directly into said chambers or to surround the latter first by passing through the jackets 16 or 17 respectively or again both methods of heating may be used.

I claim:

1. The process of purifying volatile acids contaminated by impurities which consists of vaporizing the acid, passing it over absorbent charcoal heated to a temperature of approximately 425° C., which absorbent charcoal in part physically stops the impurities and in part transforms them chemically into products which are not injurious for further treatment of the acids.

2. The process of purifying volatile acids contaminated by impurities which consists of vaporizing the acid, passing it over absorbent vegetable charcoal heated to a temperature of approximately 425° C., which absorbent vegetable charcoal in part physically stops the impurities and in part transforms them chemically into products which are not injurious for further treatment of the acids.

3. The process of purifying acetic acid contaminated by impurities which consists of vaporizing the acid, passing it over a body of absorbent charcoal, heated to a temperature of approximately 425° C., which body of absorbent charcoal in part physically stops the impurities and in part transforms them chemically into products which are not injurious for further treatment of the acids.

4. The process of purifying volatile acids contaminated by impurities which consists in vaporizing the acid, and passing the vapors through a body of charcoal while heated to a temperature of approximately 425° C. for subjecting said vapors to the influence of said charcoal.

5. The process of manufacturing ketones from volatile acids contaminated by impurities comprising volatilizing the acids, purifying the materials by bringing the volatilized gases into contact with an absorbent carbon of vegetable origin while subjected to a temperature of approximately 425° C., and thereafter passing said gases on a known catalyst for ketone conversion to convert said gases into ketones.

6. The process of manufacturing ketones from pyroligneous acids comprising vaporizing the acids by heat, passing said vapors into contact with a body of charcoal while subjected to a temperature of approximately 425° C., for purifying said vapors, passing said purified vapors on a known catalyst for ketone conversion while subjected to a temperature of approximately 450° C. and thereafter condensing said vapors into ketone.

In testimony whereof I have signed this specification.

JACQUES GEORGES MAUGER.